United States Patent
Zahand et al.

(10) Patent No.: US 9,720,854 B2
(45) Date of Patent: Aug. 1, 2017

(54) HUB-TO-HUB PERIPHERAL DISCOVERY

(71) Applicant: Microsoft Corporation, Redmond, WA (US)

(72) Inventors: Brannon James Zahand, Issaquah, WA (US); Daniel John Wallace, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/297,594

(22) Filed: Jun. 5, 2014

(65) Prior Publication Data
US 2015/0356030 A1    Dec. 10, 2015

(51) Int. Cl.
| | | |
|---|---|---|
| *G06F 13/10* | (2006.01) | |
| *G06F 13/20* | (2006.01) | |
| *G08B 21/24* | (2006.01) | |
| *H04W 4/02* | (2009.01) | |
| *H04W 64/00* | (2009.01) | |

(52) U.S. Cl.
CPC ............. *G06F 13/10* (2013.01); *G06F 13/20* (2013.01); *G08B 21/24* (2013.01); *H04W 4/02* (2013.01); *H04W 64/00* (2013.01)

(58) Field of Classification Search
CPC ........ G06F 3/0481; G06F 17/30; G06F 21/44; G06F 13/10; G06F 13/20
See application file for complete search history.

(56) References Cited

U.S. PATENT DOCUMENTS

| | | | |
|---|---|---|---|
| 6,034,596 A * | 3/2000 | Smith | ................... B60C 23/009 340/445 |
| 6,885,848 B2 | 4/2005 | Lee | |
| 7,973,657 B2 | 7/2011 | Ayed | |
| 8,115,609 B2 | 2/2012 | Ketari | |
| 8,321,124 B2 | 11/2012 | Curatolo et al. | |
| 8,457,617 B2 | 6/2013 | Sweeney et al. | |
| 8,472,876 B1 | 6/2013 | Lee et al. | |

(Continued)

FOREIGN PATENT DOCUMENTS

| | | |
|---|---|---|
| CN | 103581825 A | 2/2014 |
| EP | 2827168 A1 | 1/2015 |
| GB | 2411752 A | 9/2005 |

OTHER PUBLICATIONS

"International Search Report and Written Opinion Issued in PCT Application No. PCT/US2015/034086", Mailed Date: Sep. 21, 2015, 11 Pages.

*Primary Examiner* — Henry Tsai
*Assistant Examiner* — John Roche

(57) ABSTRACT

Aspects of the disclosure enable location of a wireless peripheral by a computing device even when the wireless peripheral is beyond a communication range of, or otherwise inaccessible by, the computing device. A user gives a command to a first computing device to determine the location of the wireless peripheral. The first computing device requests other networked computing devices to locate the wireless peripheral. At least one of the other networked computing devices establishes communication with the wireless peripheral, obtains location information for the wireless peripheral, and communicates the location information to the first computing device. The first computing device communicates the location of the wireless peripheral to the user.

20 Claims, 5 Drawing Sheets

(56) References Cited

U.S. PATENT DOCUMENTS

| | | |
|---|---|---|
| 2006/0028339 A1 | 2/2006 | Ogino et al. |
| 2007/0258346 A1* | 11/2007 | Bucher et al. ............... 369/116 |
| 2008/0125040 A1 | 5/2008 | Kalayjian |
| 2008/0140400 A1* | 6/2008 | Blass et al. ................. 704/246 |
| 2008/0288633 A1* | 11/2008 | Evans ................. G06F 3/1209 709/224 |
| 2009/0036205 A1* | 2/2009 | Seacat et al. .................. 463/30 |
| 2009/0121929 A1* | 5/2009 | Binding et al. .......... 342/357.07 |
| 2009/0195402 A1* | 8/2009 | Izadi et al. ................ 340/686.6 |
| 2009/0325686 A1* | 12/2009 | Davis et al. ................... 463/25 |
| 2010/0210240 A1 | 8/2010 | Mahaffey et al. |
| 2011/0077025 A1 | 3/2011 | Kudo |
| 2011/0231542 A1* | 9/2011 | Komano ............ H04N 1/00344 709/224 |
| 2011/0287757 A1* | 11/2011 | Nykoluk ................ G08C 17/02 455/419 |
| 2012/0057508 A1* | 3/2012 | Moshfeghi ................... 370/277 |
| 2012/0235860 A1 | 9/2012 | Ghazarian |
| 2012/0315902 A1 | 12/2012 | Nakahama et al. |
| 2013/0069782 A1 | 3/2013 | Duggal et al. |
| 2013/0190943 A1* | 7/2013 | Wester ...................... G05F 5/00 700/297 |
| 2014/0150100 A1* | 5/2014 | Gupta et al. .................. 726/22 |

* cited by examiner

HUB-TO-HUB PERIPHERAL DISCOVERY

BACKGROUND

Wireless peripherals for operating many electronic devices such as gaming consoles, televisions, video players, desktop computers, laptop computing devices, air conditioners, and the like are common. In fact, it is common to have numerous such wireless peripherals to operate the many electronic devices in a single house. An example of such an equipped home may have a TV in nearly every room, at least one gaming console, a desktop computer, and multiple laptops. People use the wireless peripherals to remotely control the electronic devices. Examples of wireless peripherals include a wireless mouse, a wireless keyboard, wireless gaming controllers, and wireless headsets. Because the size of these peripherals has reduced considerably, the peripherals are prone to becoming misplaced. Further, a peripheral to be used in one room may often end up in another room, be placed in locations not immediately visible (e.g., in drawers), or otherwise be lost. This leads to frustration as people search for the wireless peripherals when attempting to control the electronic devices.

Some attempts have been made to solve the problem of locating a misplaced wireless peripheral. Some existing systems involve the attachment of a physical tag to each wireless peripheral that beeps when queried electronically by an electronic device specifically designed for this purpose. In such systems, this additional, special-purpose electronic device is yet another device that may become misplaced or have their separate power source (e.g., battery) run down. Further, the range of this additional electronic device is limited, thereby limiting the usefulness of the device.

SUMMARY

Examples of the disclosure enable determination of a location of a wireless peripheral by a computing device even when the peripheral is beyond the communication range of, or otherwise inaccessible to, the computing device. A user gives a command to a first computing device to determine the location of a peripheral. The first computing device communicates with other networked computing devices requesting those devices to determine the location of the peripheral. The peripheral is within the communication range of, or otherwise accessible to, at least one of the other networked computing devices. Then at least one of the other networked computing device establishes a communication with the peripheral, obtains the location of the peripheral, and communicates the obtained location back to the first computing device. The first computing device communicates the location of the peripheral to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
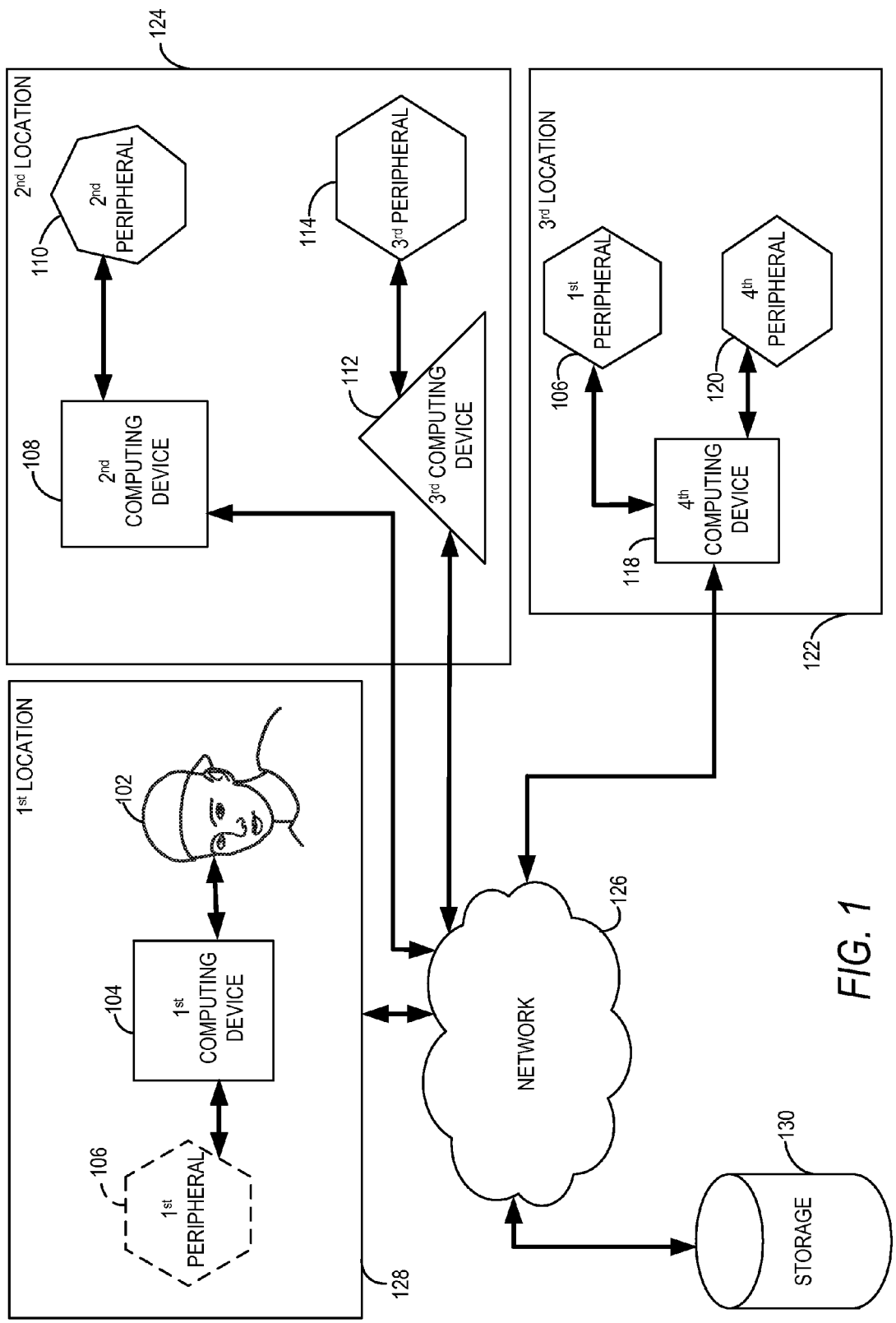
FIG. 1 is an exemplary block diagram illustrating an overall environment of computing devices and associated peripherals within a house.

Referring to the figures, examples of the disclosure enable determination of a location of a wireless peripheral associated with a device of a user, even when the peripheral is not visible to the user, when the device is not in communication with the peripheral (e.g., via radio frequency or infrared waves), and/or when the peripheral is in a low-power state. Aspects of the disclosure enable hub-to-hub peripheral discovery, such as from one computing device to another computing device. For example, a user 102 of a $1^{st}$ computing device 104 commands the $1^{st}$ computing device 104, via voice command or otherwise, to find a $1^{st}$ peripheral 106 associated with the $1^{st}$ computing device 104 (e.g., for use in controlling the $1^{st}$ computing device 104). The $1^{st}$ peripheral 106 is capable of establishing a two way communication with the $1^{st}$ computing device 104 and other computing devices that may be available on the current premises of the home of the user when the $1^{st}$ peripheral 106 is within a communication range of, or otherwise accessible by, any of the on-premises computing devices. When the $1^{st}$ computing device fails to establish communication with the $1^{st}$ peripheral 106, the $1^{st}$ computing device enlists the aid of other computing devices connected to the $1^{st}$ computing device 104. The other computing devices attempt to communicate with the $1^{st}$ peripheral 106. In some examples, because at least one of the other computing devices is at another location, the other computing devices (e.g., $4^{th}$ computing device 118) may be able to establish a communication with the $1^{st}$ peripheral 106. For example, the $1^{st}$ peripheral 106 is within a communication range of, or otherwise accessible by, the $4^{th}$ computing device 118. Once the $4^{th}$ computing device 118 is able to establish communication with the $1^{st}$ peripheral 106, the $4^{th}$ computing device 118 queries the $1^{st}$ peripheral 106 to determine its location. The determined location is received by the $4^{th}$ computing device 118 from the $1^{st}$ peripheral 106, and communicated to the $1^{st}$ computing device that, in turn, conveys the location to the user. For example, the $1^{st}$ computing device displays the location on a monitor of a gaming console.

In some examples, the computing device (e.g., the $4^{th}$ computing device 118) that establishes a communication with the $1^{st}$ peripheral 106 obtains a status of the $1^{st}$ peripheral 106 and further communicates the obtained status to the $1^{st}$ computing device 104. The obtained status may describe the environment of the $1^{st}$ peripheral 106, such as an amount of ambient light and/or any sound detected at the location of the $1^{st}$ peripheral 106 or whether or not one or more buttons/keys on the $1^{st}$ peripheral is held down (say, by an object being placed on the peripheral or the peripheral resting upside-down on said buttons/keys). For example, the status of the $1^{st}$ peripheral 106 may include a brief (or ongoing) recording of sounds detected by a microphone on the $1^{st}$ peripheral 106. The information relating to the environment of the $1^{st}$ peripheral 106 is provided to the user 102 to help in confirming the location of the $1^{st}$ peripheral 106. Further, the computing device that establishes a communication with the $1^{st}$ peripheral 106 may activate an indicator on the hitherto untraceable $1^{st}$ peripheral device 106 to help the user locate the $1^{st}$ peripheral device 106. The indicator includes, for example, a light, a sound, vibration, etc.

Aspects of the disclosure provide an easy means to determine a location of a misplaced peripheral when the peripheral is not in communication with its associated computing device (e.g., when a wireless game controller is not in proximity with its associated gaming console). Examples of the disclosure utilize the capabilities of other computing devices to locate the lost peripheral. These other computing devices may either be able to communicate with the misplaced peripheral, or contact other computing devices that may be able to communicate with the misplaced peripheral. No additional device dedicated to locating lost peripherals is required for determining the location of the misplaced peripheral in the examples described herein. Further, computing devices that are not associated with a given peripheral (e.g., gaming consoles not currently linked to a particular wireless controller) may be used to obtain the location of a misplaced peripheral and/or activate an alarm on the misplaced peripheral. Thus, aspects of the disclosure obviate the necessity of such special-purpose or dedicated devices to locate misplaced peripherals. Further, the availability of existing on-premises computing devices is leveraged to determine the location of misplaced peripherals.

In one example, the disclosure contemplates use of "Internet of Things" hub-to-hub communication to discover peripherals within a current premise of a home of the user 102. The Internet of Things may include a network of devices having the ability to capture information via sensors. Further, such devices may be able to track, interpret, and communicate collected information. These devices act in accordance with user preferences and privacy settings to transmit information and work cooperatively with other devices. Information may be communicated directly among individual devices, or via a network such as a Local Area Network (LAN), Wide Area Network (WAN), a "cloud" of interconnected LANs or WANs, or across the Internet. These devices may be integrated into computers, appliances, wearable devices, implantable devices, vehicles (e.g., car, planes, and trains), toys, buildings, and virtually any object.

Referring to FIG. 1, an exemplary block diagram illustrates a user 102 associated with a $1^{st}$ computing device 104, which in this example is the host computing device for the $1^{st}$ peripheral 106. The $1^{st}$ computing device 104 is placed in a $1^{st}$ location 128. The $1^{st}$ peripheral 106 may not be in communication with its $1^{st}$ computing device 104 and hence shown as dashed in FIG. 1. For example, the $1^{st}$ peripheral 106 may have been misplaced and may be capable of communication with another computing device, such as the $4^{th}$ computing device 118 in a $3^{rd}$ location 122. A $2^{nd}$ computing device 108 and a $3^{rd}$ computing device 112 are placed in a $2^{nd}$ location 124.

All the locations are on the premises of the user 102, in this example. All the on-premises computing devices may be in communication with each other either directly or via a network 126. The computing devices may be of different type. For example, the $1^{st}$ computing device 104 may be a gaming console, the $2^{nd}$ computing device 108 may be a desktop computer, the $3^{rd}$ computing device 112 may be a tablet, and the $4^{th}$ computing device 118 may be a laptop. The $2^{nd}$ computing device 108 is the host device for a $2^{nd}$ peripheral 110. The $3^{rd}$ computing device 112 may be the host device for a $3^{rd}$ peripheral 114. The $4^{th}$ computing device 118 may be the host device for $4^{th}$ peripheral 120, but is either in communication with the $1^{st}$ peripheral 106 or can establish communication with it because the $1^{st}$ peripheral 106 has been placed in $3^{rd}$ location 122 (e.g., mistakenly or otherwise). For example, the $4^{th}$ computing device 118 may be proximate to, or otherwise nearby, the $1^{st}$ peripheral 106.

The peripherals include a variety of peripherals that may be coupled to various devices containing electronic control and communication circuitry capable of communication with the peripherals wirelessly or otherwise. The communication between a peripheral and a computing device may be of any type including, for example, any radio frequency (RF) or infrared (IR) technology such as wireless fidelity (Wi-Fi), BLUETOOTH brand communications, near field communication (NFC), radio frequency identification (RFID), and/or others. The peripherals, at any point of time may be powered on with full power (e.g., normal operating state), on with low power (e.g., in a low power standby mode), or off (e.g., battery power depleted). The low power state may include a minimal activity state (e.g., not interacting with a user and/or a computing device for a predetermined period and transitioning to low power state to conserve battery). The low power state includes the capability to receive a query from a computing device and respond (e.g., by sending a single low power pulse). In one example, the single low power pulse may contain an identifier of the peripheral. The low power state may include a state in which a wake-up command received from a computing device transitions the peripheral to full power state. One technology capable of supporting such a low power state includes transceivers supporting BLUETOOTH brand communications.

In some examples, the peripherals have onboard sensing devices such as a gyroscope, an accelerometer, and/or a global positioning system (GPS). Alternatively or in addition, the peripherals have onboard temperature, light, vibration, acoustic, RF, humidity and other sensors for sensing the environment in which the peripherals are currently located. In an example, the sensors remain in a standby mode to conserve battery and are activated after receiving a command from a computing device. In some other examples, the sensors remain on (e.g., when the battery has enough charge). The peripherals use their sensors to determine their location, such as the $1^{st}$ location 128, the $2^{nd}$ location 124 and the $3^{rd}$ location 122. The determined location may be relative (e.g., a calculated distance from another object) or absolute (e.g., GPS coordinates, elevation, etc.). For example, the location may be determined using Wi-Fi positioning, GPS, assisted GPS, cellular network positioning, and/or other means. In such examples, the peripherals communicate their location to any computing devices that are within a range of communication of the peripherals, when so commanded by the computing devices. Alternatively or in addition, one or more of the peripherals receive signals from any of the computing devices and respond, for example, by activating one or more sensory indicators available onboard the peripheral. The sensory indicators include, for example, a haptic indicator, an audio indicator, and/or a visual indicator (e.g., a vibration motor, a light emitting diode (LED), a buzzer, and/or a speaker).

Exemplary peripherals include, but are not limited to, a wireless mouse, a wireless keyboard or keypad, a wireless gaming controller, a TV remote, a video or audio player remote, a remote for a desktop or laptop device, a remote for a car, a remote for opening and closing a garage, a headset, a microphone, a speaker, a guitar for use with a computing device, a skateboard for use with a computing device, automobile keys, and the like. The peripherals may switch to a low power mode when not in use for a predetermined time, but remain capable of receiving and interpreting signals from one or more of the computing devices (e.g., 1$^{st}$ computing device 106 through 4$^{th}$ computing device 118) including a signal to command the peripheral to switch back to a full power mode for duplex communication.

The peripherals are capable of establishing two-way communication with any one or more of the on-premises computing devices that are within a communication range, or otherwise accessible to, the peripheral. Further, each on-premises computing device is capable of establishing a two-way communication with any peripheral so long as the peripheral is within a communication range, or otherwise accessible to, the computing device.

Each peripheral has data associated therewith that includes at least an identifier of the peripheral and an identifier of its associated computing device. Further, the data may include historical information describing a history of interactions (e.g., connections) that the peripheral had with any of the computing devices, the user 102. The historical information includes, for example, identifiers of the users and the computing devices, along with a date, time, and duration of interaction. The historical information may also describe previous attempts to find this particular peripheral. This data may be maintained for a predetermined time period and refreshed after the predetermined time period elapsed. In some examples, the data is updated each time a connection between a peripheral and a computing device is established. This data is stored on storage 130 available on the network 126 and may also be replicated on a cloud service. In some examples, the data associated with a peripheral is also stored on the peripheral itself. The on-network storage 130 may be associated with one or more computing devices, may represent a storage area available on the network 126 (e.g., cloud storage), or both.

In one example, the data describing the peripherals includes a serial number, at least one property of the peripheral such as means of communication with the computing device (e.g., RF, IR, etc.), battery time remaining, software version, identifiers of previous users of the peripheral, and the like. The data may further describe peripheral capabilities (e.g., play and/or record audio and/or video). In some examples, at least a part of the data describing the peripheral is used to determine the current location of the peripheral, such as by sending a subset of the data while querying other computing devices about the whereabouts of the peripheral.

In one scenario, when the user 102 wants to use the 1$^{st}$ peripheral 106, the users 102 finds that the 1$^{st}$ peripheral 106 is not readily found. The user 102 then commands the 1$^{st}$ computing device 104 to determine the location of the 1$^{st}$ peripheral 106. The user 102 may give a verbal command recognized by the 1$^{st}$ computing device 104 via an always-on speech recognition application running on the 1$^{st}$ computing device 104. Further, the user 102 may give the command using a wired or wireless keyboard, a wired or wireless keypad, an on-screen keyboard, a game controller, gesture inputs, and/or other means. The command may be given via a touch-sensitive interface and/or a natural user interface. The user may give an implicit command, such as by typing in a password. Alternatively or in addition, the 1$^{st}$ computing device 104 may recognize the facial expressions of the user as a request or command to find the 1$^{st}$ peripheral 106. The command may include selecting one or more options available on a display associated with the 1$^{st}$ computing device 104. For example, the user may select a specific peripheral either by an identifier of the peripheral or a set of peripherals, or select all peripherals associated with the 1$^{st}$ computing device 104. The user may also select a peripheral for location determination by its status or state (e.g., select the last mouse used by the user 102, select a peripheral with the lowest battery level among all the available peripherals, or select all peripherals in low power state). As another example, the user 102 may command the 1$^{st}$ computing device 104 to locate all peripherals within a predetermined distance from the 1$^{st}$ computing device 104.

The 1$^{st}$ computing device 104, upon receiving the command from the user 102, sends a query to the 1$^{st}$ peripheral 106. If the 1$^{st}$ peripheral 106 responds, then the 1$^{st}$ computing device 104 obtains the location of the 1$^{st}$ peripheral 106 either from the 1$^{st}$ peripheral 106 itself, or the 1$^{st}$ computing device 104 determines the location of the 1$^{st}$ peripheral 106. The 1$^{st}$ peripheral 106 may be able to communicate with the 1$^{st}$ computing device 104 because the 1$^{st}$ peripheral 106 may be located within the 1$^{st}$ location 128. In one example, the 1$^{st}$ peripheral 106 determines its location via one or more onboard sensors (e.g., a GPS receiver) and communicates the determined location to the 1$^{st}$ computing device 104. In other examples, the 1$^{st}$ computing device 104 determines the location of the 1$^{st}$ peripheral 106. After obtaining the location information, the 1$^{st}$ computing device 104 provides the location information to the user 102.

In some of the examples in which the 1$^{st}$ peripheral 106 is not equipped to determine its position, the 1$^{st}$ computing device 104 may be able to determine the location of the 1$^{st}$ peripheral 106, such as by using IR signals from a depth sensing device available on the 1$^{st}$ computing device 104, thereby enabling location determination of the 1$^{st}$ peripheral 106 even when the location is obscured from the user 102.

However, when the 1$^{st}$ peripheral 106 is not within the communication range of, or is other inaccessible by, the 1$^{st}$ computing device 104 as shown in FIG. 1 and/or the 1$^{st}$ computing device 104 does not receive any response from the 1$^{st}$ peripheral 106, the 1$^{st}$ computing device 104 sends out a request to other computing devices to which it is linked directly or via the network 126. The network may be a short range wired or wireless network. For example, the network 126 may support BLUETOOTH brand communications, Wi-Fi communications, and the like. The communication from the 1$^{st}$ computing device 104 may include at least some part of the data of the 1$^{st}$ peripheral 106 (as described herein) which helps other computing devices to identify the 1$^{st}$ peripheral 106. As shown in FIG. 1, the 1$^{st}$ peripheral 106 may be in the 3$^{rd}$ location 122, where the 4$^{th}$ computing device 118 is either able to establish a communication with the 1$^{st}$ peripheral 106 or is already in communication therewith. The 4$^{th}$ computing device 118 determines the location of the 1$^{st}$ peripheral 106 within the 3$^{rd}$ location 122 either by obtaining the determined location from the 1$^{st}$ peripheral 106, or by determining the location itself. The 4$^{th}$ computing device 118 transmits the determined location to the 1$^{st}$ computing device 104. The 1$^{st}$ computing device 104 provides the determined location to the user 102. In some examples, the 1$^{st}$ computing device 104 may provide the location information in the form of an on-screen display of the location of the 1$^{st}$ peripheral 106 on a display device associated with the 1$^{st}$ computing device 104. The on-screen display information may describe an on-premises location of the 1$^{st}$ peripheral 106 (e.g., the 3$^{rd}$ location 122 as shown in FIG. 1). In one example, the 4$^{th}$ computing device 118 provides the location of the place where the 1$^{st}$ peripheral 106 is currently residing such as a living room, a master bedroom, kitchen, dining space, etc., together with a location identifier.

In one example, whenever the location information associated with a peripheral is sent from one computing device to another, or the peripheral itself sends its location information to its host computing device, the location information includes at least a part of the data describing the peripheral. For example, the data describing the peripheral includes the identification of the peripheral, an identifier of its primary computing device, and a list of all users that used the peripheral within a recent predetermined period (e.g., a week). Further, additional data may be sent that includes a physical location (such as room designation) of the place where the peripheral is currently located (e.g., the $3^{rd}$ location 122). The data may also include the status of the peripheral and its current environment. The status may include the battery level, the power state (e.g., low power or full power), and/or the state of the onboard indicators and sensors. The environment may include the physical orientation of the peripheral (e.g., standing up, lying flat, lying on the side, or upside down), the ambient light (e.g., obscured from visible light such as stuck under a couch, lying under a pillow, or placed within a closed cabinet), the ambient audible sound (e.g., in a room with music playing), and ambient electrical signals (e.g., RF transmissions), and the ambient vibratory noise (e.g., on a dancing floor), all of which are determined by sensors on the peripheral. The environment data may also describe the acoustic environment, such as whether the ambient sound is muffled (e.g., under a blanket or a pillow) or in a loud room (e.g., the kitchen or laundry room).

In some examples, the $1^{st}$ computing device 104 requests the $4^{th}$ computing device 118 to turn on an indicator available on the $1^{st}$ peripheral 106 such a vibration motor, flashing an LED, and/or emitting a beep.

In one example, when the $1^{st}$ computing device 104 is not able to establish contact with the $1^{st}$ peripheral 106, the $1^{st}$ computing device 104 checks a history log stored on storage 130. The history log stored on the storage 130 contains data associated with the $1^{st}$ peripheral 106 and all other peripherals. The history log contains the last connection state of the $1^{st}$ peripheral 106 in addition to other data associated with the $1^{st}$ peripheral 106 as discussed herein (e.g., the historical information). The $1^{st}$ computing device 104 analyzes the stored data to estimate a probable current location of the $1^{st}$ peripheral 106, and thereby identifying candidate computing devices to contact. The $1^{st}$ computing device 104 communicates selectively with the candidate computing devices in whose location the $1^{st}$ peripheral 106 is likely to be lying based on the history log, asking those candidate computing devices if the $1^{st}$ peripheral 106 is lying within their location. Alternatively or in addition, the $1^{st}$ computing device 104 broadcasts a request to all the computing devices. One or more of the computing devices that respond to the query from the $1^{st}$ computing device 104 are requested by the $1^{st}$ computing device 104 to determine the location of the $1^{st}$ peripheral 106 and communicate the determined location to the $1^{st}$ computing device 104.

In another example, when none of the computing devices (e.g., $2^{nd}$ computing device 108 through $4^{th}$ computing device 118) are able to affirmatively establish contact with the $1^{st}$ peripheral 106, each of the other computing devices retrieves data relating to the $1^{st}$ peripheral 106 that contains information relating to the last interaction that the $1^{st}$ peripheral 106 had with it (e.g., the history log, historical information, or the like). Each of the computing devices (e.g., the $2^{nd}$ computing device 108 through the $4^{th}$ computing device 118) sends this information to the $1^{st}$ computing device 104. The information sent by other computing devices is provided to the user 102. Thus, the last known information about the $1^{st}$ peripheral 106 is communicated to the user 102, who may use the information provided to determine the current location of the $1^{st}$ peripheral 106.

Figure 2:
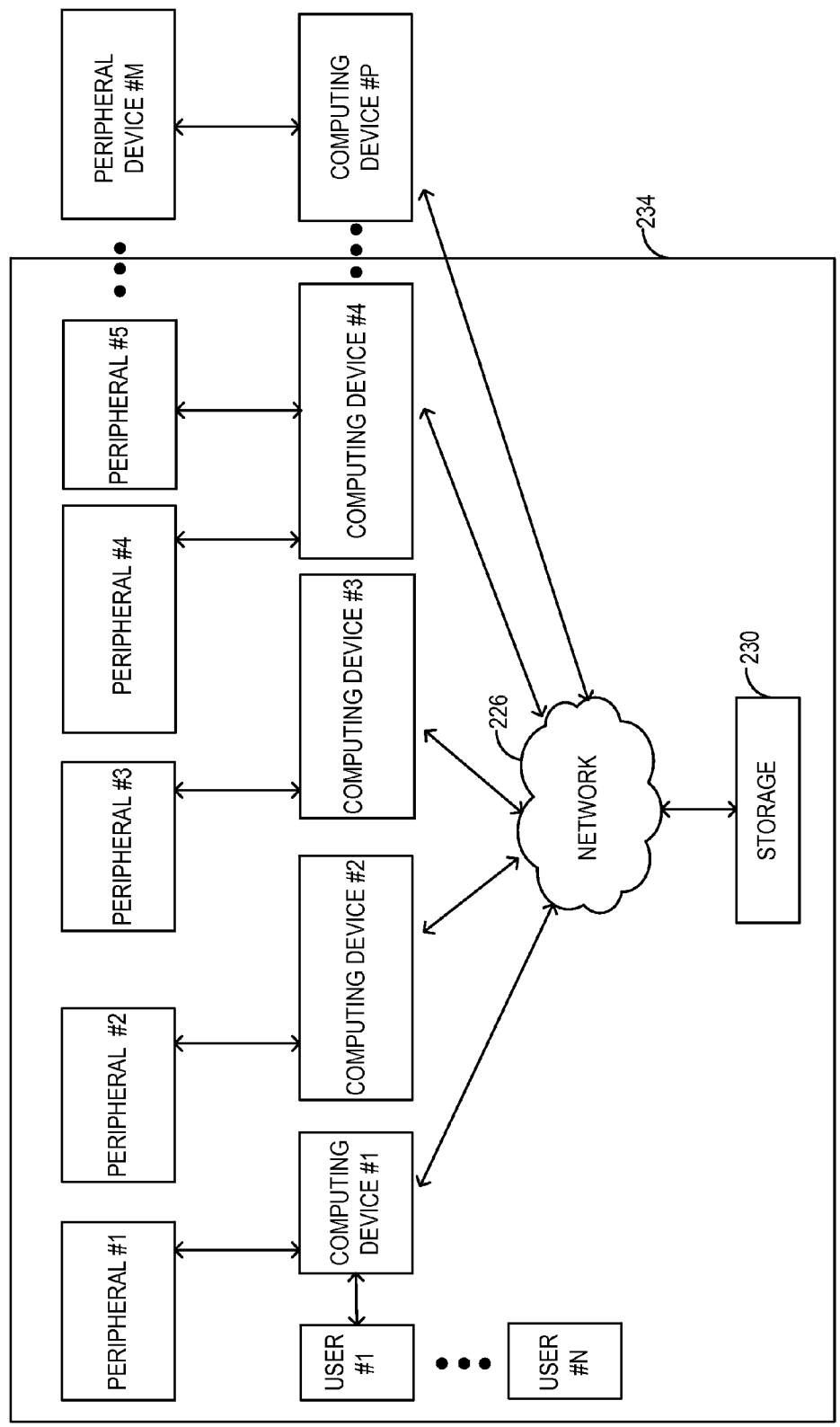
FIG. 2 is an exemplary schematic diagram illustrating a plurality of computing devices in communication with each other and a plurality of peripherals via a network.

Referring now to FIG. 2, a plurality of computing devices, such as computing device #1 through computing device #P, are connected together via a network 226. The network 226 may be a corporate network, an ad-hoc network, a peer-to-peer network, a local area network, a wide area network, or the Internet. The network 226 may be wired or wireless. However, each computing device on the network 226 may not be visible or accessible to all the other computing devices. The computing devices may be located far from each other, such as on an academic campus or in a neighborhood. FIG. 2 shows a plurality of users, such as user #1 through user #N, where user each is associated with their corresponding computing device. In some examples, one user may have more than one computing device. FIG. 2 illustrates a plurality of peripherals, such as peripheral #1 through peripheral #M, such that at least one peripheral is associated with at least one of the computing devices. In examples of the disclosure, the quantity of peripherals may be more than, less than, or equal to the quantity of computing devices.

In some cases, more than one peripheral is associated with a computing device. For example, peripheral #4 and peripheral #5 have computing device #4 as their host device. In one example, a user (e.g., user #1 in FIG. 2) may be able to configure the peripherals associated with them (e.g., peripheral #1). In some examples, the configuration includes the way a configured peripheral responds to a query from its associated computing device. For example, the peripheral may configured to merely acknowledge receipt of a query. In other examples, based on the configuration, the peripheral may communicate data associated with the current state and environment of the peripheral. The user #1 may configure the peripheral to respond to a query or a command by enabling or activating one or more onboard indicators and/or sensors. Data associated with the peripherals, such as the historical information and other data described herein, is stored on the network storage 230 while data (e.g., configuration data) associated with each peripheral is stored on its associated host computing device and may be replicated on the peripheral itself.

A subnet 234 of the computing devices may be configured so that each computing device in the subnet 234 is explicitly visible to the other computing devices, such as shown in FIG. 2. In one example, the subnet represents or corresponds to a subset of the computing devices and the peripherals. In other examples, the subnet 234 may include all the computing devices and peripherals. In an example, the computing devices in the subnet 234 may be visible to each other by sharing their computer name or Internet Protocol (IP) address, and may grant access to each other for specific operations. The data associated with each peripheral that has a host in the subnet 234 of computing devices is accessible to each computing device of the subnet 234. Each peripheral has a low power, always-on state in which the peripheral may receive communication from any of the computing devices in the subnet 234 and respond with minimal power. Each user has at least one computing device associated therewith. For example, user #1 has computing device #1 associated therewith.

Aspects of the disclosure are operable in environments with automatic sign-in. In such environments, the user is automatically signed-in when the user enters a designated space (e.g., room) where the computing devices and peripherals are located. For example, when the user #1 enters a cubicle where the computing device #1 and its associated peripheral #1 is located, the user #1 is automatically signed-in to one or both of the computing device #1 and the peripheral #1. Each peripheral may switch to a low power state when idle, but has the capability to establish a two-way communication with the host computing device and with other computing devices within the subnet 234 even in such a low power state. Each peripheral may notify its associated computing device when it transitions to the low power state and/or when its battery power is running low. When notified by a peripheral, the computing device informs its user that the peripheral is running low on power and needs charging. In one example, the last identified location of the peripheral may be stored in the storage 230 in such cases (e.g., before the battery completely exhausts). Thus, the last identified location of a peripheral may be determined by examining the storage data even when the peripheral has completely powered off.

Because a user, the associated computing device, and the associated peripheral form a matched set in some examples, the peripheral may notify the associated computing device when the peripheral becomes connected to another computing device. For example, if the peripheral connects to a computing device within its subnet such as subnet 234, the peripheral merely informs the associated computing device. However, if the peripheral is connected to a computing device outside its subnet, the peripheral raises an alarm for the user such as a blinking signal in a toast window on its associated computing device.

The computing device maintains a history log for each of its associated peripherals, including all the locations where the peripheral was placed during a predetermined time interval, the identifiers of all the users that used the peripheral, and the number of times the user commanded the computing device to locate the peripheral. The history log may detail all the locations where the peripheral was found each time the user misplaced it together with the date, time and frequency of misplacement. The computing device maintains or otherwise updates this data on a periodic or intermittent basis. For example, the history log for at least a subset such as subnet 234 comprising computing device #1, computing device #2, computing device #3, computing device #4, peripheral #1, peripheral #2, peripheral #3, peripheral #4, and peripheral #5 is stored on the network storage 230, while data relating to each peripheral is stored on its host computing device as well as on the peripheral.

When a user is not able to readily find a peripheral, the computing device may use the history log to begin the search for the peripheral from a most likely location to the least likely location based on the past stored data. Further, similar data of all users in the subnet 234 may be used to develop a probabilistic model for use in searching for a misplaced peripheral. The model may be updated based on each successful search. Such a crowd-sourced probabilistic model based on data collected from a plurality of users working in similar environments (e.g., those working within the subnet 234) is used to optimize the search for misplaced peripherals.

The computing devices may also be used to diagnose malfunctioning peripherals, such as identifying stuck buttons, low IR output, low battery, and/or any indicator or sensor malfunction. The computing device may guide a user to carry out a step-by-step diagnosis of a problem, for example, by providing on-screen demonstration and guidance. In environments in which the computing devices may have access to the Internet, the computing devices identify newer versions of connected peripherals and suggest an upgrade to the user. In some examples, the computing devices provide discount coupons for purchasing an upgraded version of the peripheral.

In an example when the user #1 is not able to locate their peripheral (e.g., peripheral #1), the user #1 commands the computing device #1 to locate the peripheral #1 via an oral command, a natural user interface, a touch-sensitive interface, and/or other means. The computing device #1 may locate the peripheral #1 initially by sending an interrogation signal to the peripheral #1. If the peripheral #1 is switched off (e.g., due to low battery or otherwise), the computing device #1 receives no response. Because the computing device #1 may have at least one depth sensing IR device, the computing device #1 may scan the three-dimensional space of user #1 (e.g., the space within the cubicle where the user #1 sits). The computing device #1 scans for the peripheral #1 using sensors of the peripheral #1 that enable scanning in areas which are not lit and thus difficult to view by the human eye (e.g., IR scanners).

If the computing device #1 is not able to locate the peripheral #1, the computing device #1 communicates with other computing devices of the subnet 234. For example, the computing device #1 communicates with computing device #2, computing device #3, and computing device #4 to provide a part of the data associated with the peripheral #1 that includes at least one identifier of the peripheral #1. Each of these computing devices attempts to communicate with the peripheral #1 by broadcasting a query. In one scenario, the user #1 may have visited a colleague in the colleague's cubicle for a meeting, while carrying the peripheral #1 (e.g., a wireless mouse) and may have mindlessly left the peripheral #1 there. Hence, the peripheral #1 is now within a communication range of computing device #4, and responds to a query from the computing device #4. The computing device #4 determines the location information of the peripheral #1, or obtains the location information from the peripheral #1. The computing device #4 communicates the location information to the computing device #1. The computing device #1, thereafter, provides guidance to the user #1 for retrieving the peripheral #1.

Figure 3:
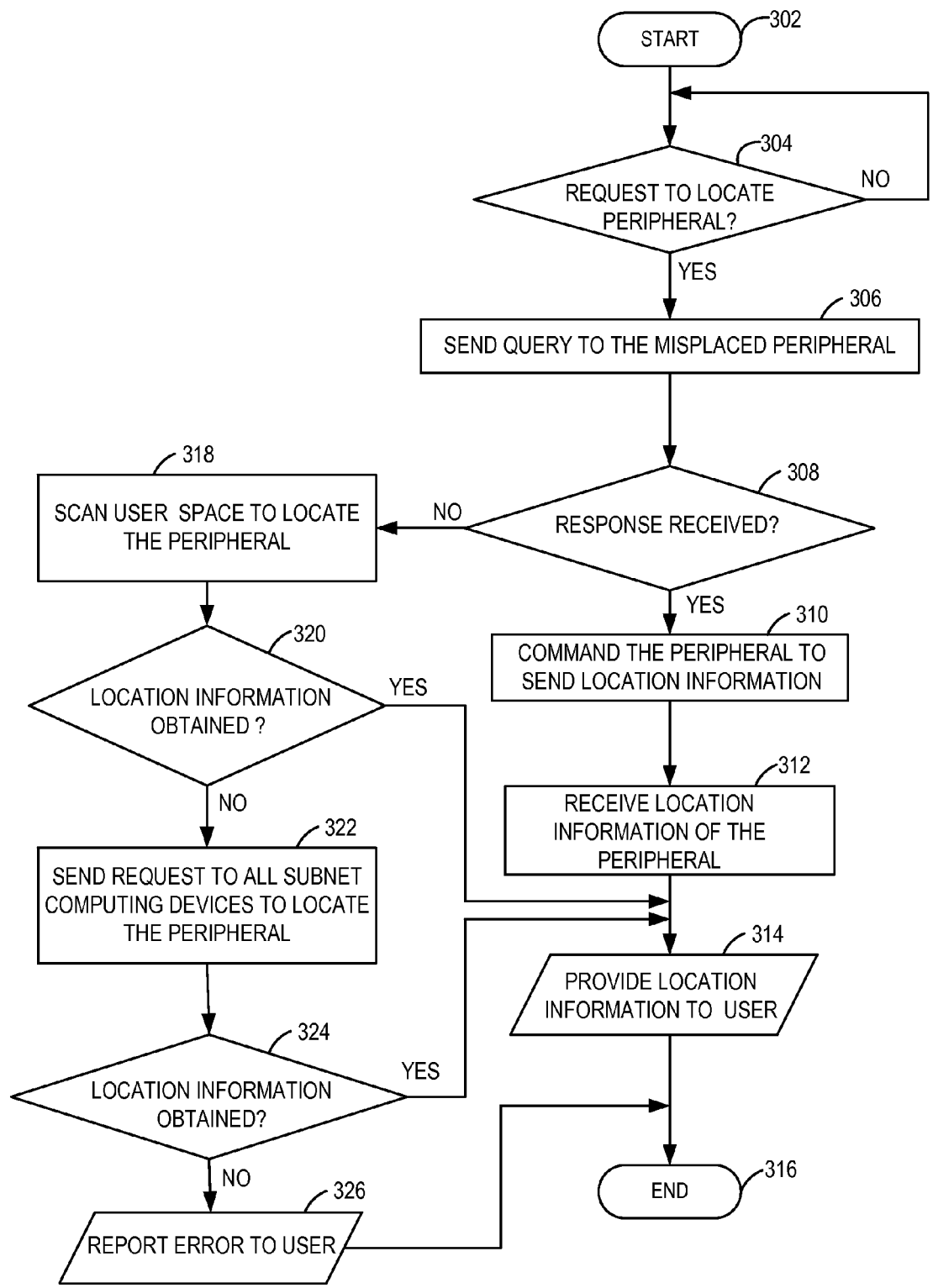
FIG. 3 is an exemplary flowchart illustrating a process of obtaining the location of a peripheral.

Referring next to FIG. 3, an exemplary flowchart illustrates operations that, when executed by a computing device, locate a misplaced peripheral. The operations begin at 302. At 304, the computing device checks if a request or command to locate the peripheral has been received. For example, a wireless mouse may have been tucked away in a shelf but the user (e.g., user #1) does not remember now where the wireless mouse is located. In such a case, the user, for example, may give an oral or verbal command to the computing device (e.g., computing device #1) to locate the peripheral. In another example, the peripheral has not been connected to its associated computing device and the associated computing device has been configured to try to locate the peripheral after a predetermined period without connection. In case of an oral command, the computing device parses the command via an always-on speech recognition application executing on the computing device. As shown at 306, the computing device sends a query to the peripheral. At 308, the computing device checks whether a response from the queried peripheral (e.g., the peripheral #1) has been received. If a response has been received, then at 310 the computing device sends a command to the peripheral instructing the peripheral to communicate its location information. At 312, the computing device receives the location information. At 314, the computing device provides the received location information to the user, and the process completes at 316.

If, however, the queried peripheral fails to respond, then at 318 the computing device scans the space around the computing device in an attempt to determine the location of the misplaced peripheral (e.g., using means other than visible light). For example, the computing device may use IR waves and a corresponding sensing device, or may send an RF wave and receive a reflected RF wave that may be used to estimate the location of the peripheral. At 320, the computing device checks if the location information has been received in response to the scanning operation. If scanning yields the location information of the peripheral, at 314 the computing device provides the location information to the user.

If, however, scanning fails to obtain the location information (e.g., because the peripheral is not lying anywhere near the computing device), the computing device sends a request to one or more of other computing devices (e.g., the computing devices within a subnet such as subnet 234) at 322 to try to locate the peripheral. If at least one of these other computing devices is able to obtain the location information of the peripheral at 324, this other computing device sends the location information to the request-originating computing device. The location information is then provided to the user at 314.

If however, none of the other computing device are able to locate the peripheral at 324, the request-originating computing device may generate an error signal and report the error to the user at 326 and then end at 316. In some examples, any of the computing devices may re-attempt to locate the peripheral after a predefined back-off time period (e.g., 8-10 hours). Such situations may occur, for example, when a user who had carried the peripheral mistakenly to another location returns with the peripheral (e.g., a user goes to school with the peripheral in a backpack and then returns). In another example situation, a new computing device may establish communication with the other computing devices and this new computing device may be able to locate the peripheral. In still another example situation, the peripheral may revert to a low power condition from a switched off state because the battery may recover enough battery power to support a low power state.

Figure 4:
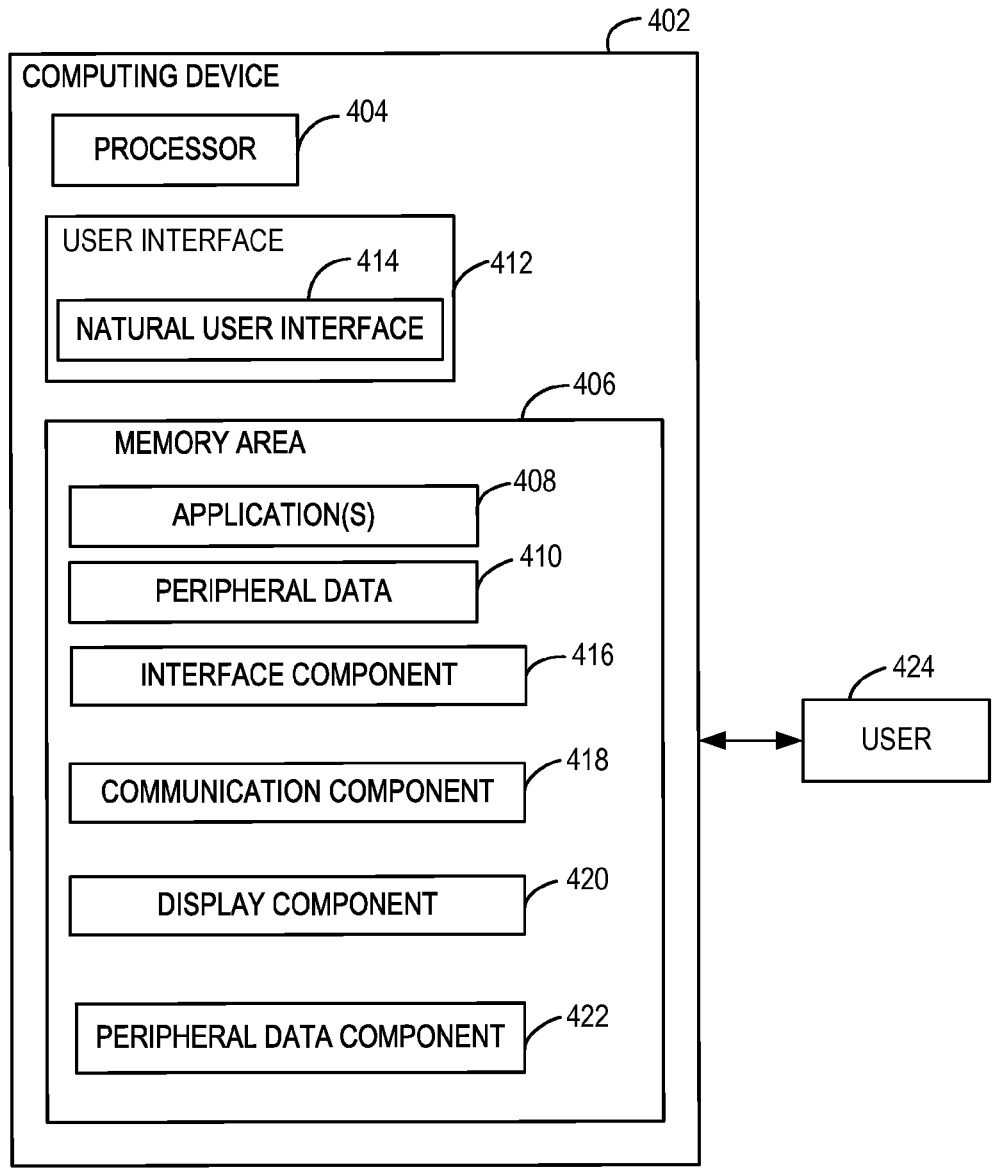
FIG. 4 is an exemplary schematic diagram illustrating a computing device with computer executable storage components for locating lost peripherals.

Referring next to FIG. 4, an exemplary block diagram illustrates a computing device 402 (such as $1^{st}$ computing device 104 or computing device #1) and a user 424 (such as user 102 in FIG. 1 or user #1 in FIG. 2). The computing device 402 represents any device executing instructions (e.g., as application programs, operating system functionality, or both) to implement the operations and functionality described herein. The functionalities described herein or other functionalities not specifically described herein may be activated via gesture recognition, touch recognition, and/or voice recognition features available on the computing device 402 in addition to other means such as usage of a keyboard and/or a pointing device, or inferences from the facial expressions of the user 424. The computing device 402 may be a computing device that acts as a gaming console in addition to being able to display commercial TV programs, and provide other services such as those provided by known computing platforms. The computing device 402 may include any portable or non-portable device including a mobile telephone, laptop, tablet, computing pad, netbook, gaming device, portable media player, desktop personal computer, kiosk, and/or tabletop device. Additionally, the computing device 402 may represent a group of processing units or other computing devices, such as in a cloud computing system or service.

The computing device 402 has at least one processor 404 and a memory area 406. The processor 404 may include any quantity of processing units, and may be programmed to execute computer-executable instructions for implementing aspects of the disclosure. The instructions may be performed by the processor 404 or by multiple processors executing within the computing device 402, or performed by a processor external to the computing device 402. In some examples, the processor 404 is programmed to execute instructions such as those illustrated in the figures (e.g., FIG. 3 and FIG. 5).

In some examples, the processor 404 represents an implementation of analog techniques to perform the operations described herein. For example, the operations may be performed by an analog computing device and/or a digital computing device.

The computing device 402 further has one or more computer readable media such as the memory area 406. The memory area 406 may include any quantity of media associated with or accessible by the computing device 402. The memory area 406 may be internal to the computing device 402, external to the computing device 402, or both.

The memory area 406 stores, among other data, one or more applications 408. The applications 408, when executed by the processor 404, operate to perform functionality on the computing device 402 to implement tasks associated with the applications 408, such as interactive games. The applications 408 include an application that performs commands received from the user 424 via a natural user interface 414, voice commands or other means. Exemplary applications 408 may include mail application programs, web browsers, calendar application programs, address book application programs, messaging programs, media applications, location-based services, search programs, gaming applications, and the like. The applications 408 may communicate with counterpart applications or services via the network such as network 226. For example, the applications 408 may represent downloaded client-side applications that correspond to server-side services executing in a cloud.

Further, the computing device 402 stores peripheral data 410, various computer executable components, and other data in the memory area 406. The computing device 402 has a user interface 412 that contains the natural user interface 414. The user interface 412 may be internal to the computing device 402 or external to the computing device 402. The user interface 412 receives gesture commands via the natural user interface 414, and/or voice commands via a microphone internal to the computing device 402 or operationally coupled thereto. Further, the user interface 412 may receive commands via touch input, pointing devices, facial expressions of the user 424, and/or other means.

Exemplary computer executable components include an interface component 416, a communication component 418, a display component 420, and a peripheral data component 422. The computer executable components may be executed by one or more processors associated with the computing device 402 (e.g., the processor 404 may execute the computer executable components). The interface component 416 receives a command from the user 424 to locate a peripheral (e.g., peripheral #1) when the peripheral is outside the communication range of the computing device 402.

The peripheral data component 422 obtains data associated with the peripheral. Exemplary data associated with the peripheral may be an identification of the peripheral such as a serial number, an identification of its host device (e.g., identification of computing device #1), properties of the peripheral, identification of the previous users of the peripheral and other data.

The communication component 418 communicates the received command and the data associated with the peripheral to other computing devices on the premises of the user 424 (such as the $2^{nd}$ computing device 108, the $3^{rd}$ computing device 112 and the $4^{th}$ computing device 118, and/or the computing device #2 through the computing device #4). In some embodiments, the communication component 418 includes a network interface card and/or computer-executable instructions (e.g., a driver) for operating the network interface card. Communication between the computing device and other devices may occur using any protocol or mechanism over any wired or wireless connection. In some embodiments, the communication component 418 is operable with short-range communication technologies such as by using near-field communication (NFC) tags.

As a consequence of receiving the command and the data associated with the peripheral, at least of the other computing devices obtains location information from the peripheral based on the data associated with the peripheral, when the peripheral is within the communication range of this computing device. The location information includes an identification of the location of the user 424 where the peripheral is located. Further, the location information may include a status of the peripheral such as the environment in which the peripheral is located. The environment may include the orientation of the peripheral, the ambient light to which the peripheral is exposed such as being in a location where there is no visible light. Further, the status may include the power status of the peripheral and remaining battery capacity. The computing device sends the obtained location information to the computing device 402, where it is received by the interface component 416. The display component 420 thereafter displays the received location information on a display of the computing device 402.

Figure 5:
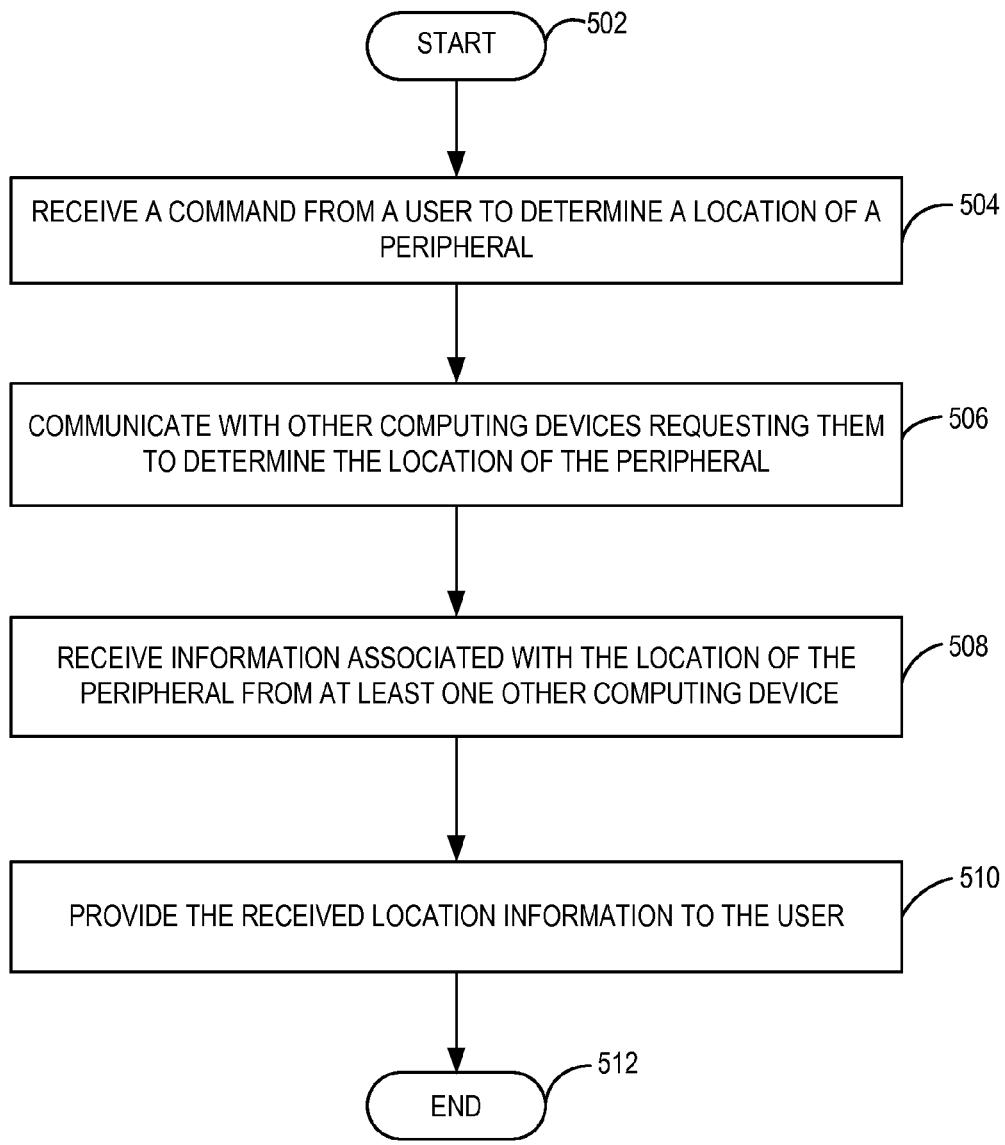
FIG. 5 is another exemplary flowchart illustrating a process of obtaining the location of a peripheral.

Referring next to FIG. 5, a flowchart illustrates the operations of locating a misplaced peripheral when the peripheral is not within the communication range of its associated computing device. The operations begin at 502. At 504, a command is received by the computing device associated with a peripheral to determine the location of the peripheral. Because the peripheral is not within the communication range of the computing device, any query sent to the peripheral by the computing device yields no response. In such a case, the computing device, (e.g. $1^{st}$ computing device 104), communicates with other computing devices at 506 (e.g., $2^{nd}$ computing device 108, $3^{rd}$ computing device 112 and/or $4^{th}$ computing device 118) requesting them to locate the peripheral. At 508, information associated with the location of the peripheral is received at least from one computing device (e.g., from the $4^{th}$ computing device 118). At 510, the received information is provided to the user (e.g., user 102). The operations end at 512.

ADDITIONAL EXAMPLES

Following is an exemplary list of natural language voice commands that may be interpreted and acted upon by a computing device such as computing device 402:
1. Where is my keypad?
2. Associate my game controller and log me into the game controller.
3. Put my game controller to sleep.
4. Find all my game controllers.
5. Find the wireless mouse with lowest remaining battery capacity.
6. Show locations of my game controllers within this room.
7. Find the last wireless mouse I used.
8. In which room is my game controller?
9. Find my favorite wireless mouse.
10. Vibrate my game controller.
11. Turn on a light on my game controller.
12. What is the remaining battery capacity of this game controller?
13. Locate my wireless headset.

In some examples, each peripheral is set to activate at least one of its indicators when, for example, the peripheral is not connected to any of the computing devices (e.g., 2nd computing device 108 through 4th computing device 118) for a predetermined period of time. Activation of an indicator on a peripheral not used for a predefined period of time may help the user to identify peripherals that are lying unused for some time.

While the attempts to locate a lost peripheral have been described in some examples as initiation from a computing device associated with the peripheral, aspects of the disclosure contemplate initiation of the attempts from any computing device (e.g., even those computing devices not expected to be near to the missing peripheral).

In some examples, the functionality described herein is embodied in one or more application programming interfaces (APIs). Aspects of the disclosure are operable with any quantity, form, structure, or type of APIs implementing operations such as illustrated and described with reference to FIG. 3 and/or FIG. 5. An exemplary API includes:

expression.GetPeriphalLocation (PeripheralIdentifierType, PeripheralIdentifier, LocationType)

This exemplary API returns a data structure containing data describing the connection history and current location of the peripheral, when available. While operable with any form of data structure, some examples contemplate an array. The array may contain any data describing the connection history, current location, and/or other data. Exemplary data within the array includes, but is not limited to, Time Last Connected, Device Connected To Friendly Name, Device Connected To Unique Identifier, Peripheral Power State, Peripheral Orientation, Peripheral Button/Key State, Peripheral Ambient Light Value, Peripheral Ambient Temperature, Peripheral Ambient Sound Decibels, User Profile Assigned To, and Location Information.

The Location Information data may be represented by a structure similar to the LocationType parameter in the above API. The LocationType parameter represents an integer value that determines how the location information is represented. Exemplary integer values and corresponding location information representations are shown in Table 1 below.

TABLE 1

Exemplary LocationType Parameter Values.

| LocationType Parameter Value | Description |
| --- | --- |
| 0 | By location friendly name (e.g., "Living Room," "Family Room," "Kitchen") |
| 1 | By GPS coordinates (e.g., "47°40'10"N 122°7'26"W") |
| 2 | By connected device network IP address. (e.g., "192.168.1.211") |

TABLE 1-continued

Exemplary LocationType Parameter Values.

| LocationType Parameter Value | Description |
|---|---|
| 4 | By connected device network friendly name. (e.g., "Miles' Home Network") |
| 8 | By connected device friendly name. (e.g., "Miles' Laptop") |

The PeripheralIdentifierType parameter represents an integer value that relates to the type of information being provided via the PeripheralIdentifier parameter. Exemplary integer values and corresponding information types are shown in Table 2 below

TABLE 2

Exemplary PeripheralIdentifierType Parameter Values.

| PeripheralIdentifierType Parameter Value | Description |
|---|---|
| 0 | A peripheral by features (e.g., "Microphone," "LED," "Printer") |
| 1 | A peripherals unique identifier (e.g., serial number, GUID, etc.) |
| 2 | A peripherals friendly name (e.g., "Miles' Controller") |
| 4 | A peripherals powered state (e.g., "Charged," "Low Power") |
| 8 | A peripherals last user by identifier (e.g., globally unique identifier) |
| 16 | A peripherals last user by friendly name (e.g., "Miles") |
| 32 | A peripheral by type (e.g., controller, headset, mouse, keyboard) |
| 64 | A peripheral by last connected to peripheral ID (e.g., serial number, MAC address, etc.) |

The PeripheralIdentifier parameter represents the string that is being searched for based on the PeripheralIdentifierType parameter value.

Alternatively or in addition to the other examples described herein, examples include any combination of the following:
  wherein the location information includes information indicating whether the one or more peripherals are obscured from visible light.
  wherein the one or more peripherals determine their location and communicate the determined location to the at least one other computing device.
  wherein the one or more of the peripherals are outside a communication range of the computing device and within a communication range of the at least one other computing device.
  wherein providing the received location information comprises providing on-screen display of the location on a display associated with the computing device.
  wherein the computing device is a gaming console.
  wherein the one or more of the peripherals comprise wireless peripherals selected from a group consisting of a game controller, a remote control, or a headset for interacting with the gaming console.
  wherein the processor is further programmed to activate one or more sensory indicators on the one or more peripherals.
  wherein the sensory indicators are selected from the group consisting of a haptic indicator, an audio indicator, or a visual indicator.
  wherein the request is selected from a group consisting of an audio command, a gesture command, or a selection of the one or more peripherals from options displayed to the user on the computing device.
  further comprising, providing, via a network, at least a subset of data associated with the peripheral to the one or more other computing devices.
  wherein the one or more other computing devices obtain the location of the peripheral via activating a location sensor associated with the peripheral.
  wherein receiving the command from the user to locate the peripheral comprises receiving a command from a user to locate a peripheral that is in a low-power state.
  wherein receiving the command from the user comprises receiving a command from a user via a natural user interface.
  wherein receiving the command from the user comprises receiving a voice command that is interpreted via an always-on speech recognition application running on the computing device.
  wherein the location information includes an identifier of a location on a current premises of the user, the identifier of the location indicating where the peripheral is located on the current premises.
  wherein the location information includes a status of the peripheral.
  wherein the status describes an environment in which the peripheral is located.

At least a portion of the functionality of the various elements shown in the figures may be performed by other elements in the figures, or an entity (e.g., processor, web service, server, application program, computing device, etc.) not shown in the figures.

In some examples, the operations illustrated in FIG. 3 and FIG. 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile memories, removable and non-removable memories implemented in any method or technology for storage of information such as computer readable instructions, data structures, program modules and other data. Computer storage media are tangible and mutually exclusive to communication media. Computer storage media exclude propagated data signals. Further, for the purposes of this disclosure, computer storage media are not signal per se. In some examples, computer storage media are implemented in hardware. Exemplary computer storage media include hard disks, flash drives, and other solid-state memories. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Less mobile or stationary computing systems described herein may at least be used to receive the messages and the movement information. Such systems or devices may accept input from the user 102 in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device (e.g., computing device 402) when configured to execute the instructions described herein.

The examples illustrated and described herein as well as examples not specifically described herein but within the scope of aspects of the disclosure constitute exemplary means for locating wireless peripherals and/or exemplary means for hub-to-hub peripheral discovery. For example, the elements illustrated in FIG. 1, FIG. 2, and/or FIG. 4 such as when encoded to perform the operations illustrated in FIG. 3 and/or FIG. 5 constitute exemplary means for receiving, by a computing device, a command from a user to locate a peripheral, exemplary means for determining a location of the peripheral via one or more other computing devices that are in communication with the computing device, and exemplary means for providing the determined location to the user.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for locating peripherals enabling interaction with a computing device, the computing device being connected to at least one other computing device, said system comprising:
   a memory area for storing data comprising a device identifier associated with at least one of the peripherals that comprises a gaming controller; and
   a processor programmed to:
      receive, by the computing device, a request from a user to locate the at least one of the peripherals;
      transmit over a network with the at least one other computing device a query for location information of the at least one of the peripherals, said query comprising a wake-up command configured to direct the at least one of the peripherals to transition to a higher power state and responsively transmit location information that includes the device identifier associated with the at least one of the peripherals and a room designation where the at least one other computing device obtaining the device identifier from the at least one peripheral is located in a house;
      receive, at the computing device and from the at least one other computing device, the location information of the at least one of the peripherals transmitted after the at least one of the peripherals transitioned into the higher power state responsive to receiving the query for the location information;
      determine that the at least one of the peripherals is located in a room of the house indicated by the room designation based on the at least one other computing device obtaining the device identifier; and
      present to the user an indication that the at least one of the peripherals is located in the room.

2. The system of claim 1, wherein the location information includes information indicating whether the at least one of the peripherals is obscured from visible light.

3. The system of claim 1, wherein the at least one of the peripherals determines ambient electrical signals or ambient vibratory noise and communicates the ambient electrical signals or the ambient vibratory noise to the at least one other computing device.

4. The system of claim 1, wherein the at least one of the peripherals is outside a communication range of the computing device and within a communication range of the at least one other computing device.

5. The system of claim 1, wherein providing the received location information comprises providing on-screen display of the room designation where the at least one peripheral is located on a display associated with the computing device.

6. The system of claim 1, wherein the computing device is a gaming console.

7. The system of claim 6, wherein the at least one of the peripherals comprises wireless peripherals selected from a group consisting of a game controller, a remote control, or a headset for interacting with the gaming console.

8. The system of claim 1, wherein the processor is further programmed to activate one or more sensory indicators on the one or more peripherals.

9. The system of claim 8, further comprising:
remotely directing, over the network, the at least one other computing device to emit depth sensing signals from a depth sensing device to identify the at least one of the peripherals; and
determining a location of the at least one of the peripherals from the depth sensing signals.

10. The system of claim 1, wherein the processor is further programmed to:
access a history of connections indicating additional computing devices that the at least one of the peripherals has historically connected, wherein the history of connections indicates times at which the at least one of the peripherals historically connected to the additional computing devices; and
base said determination that the at least one of the peripherals is located in the room of the house, at least in part, on the accessed history of connections of the at least one of the peripherals with the additional computing devices.

11. A method for locating wireless peripherals, said method comprising:
receiving, by a computing device, a command from a user to locate a peripheral, the peripheral being outside a communication range of the computing device, wherein the peripheral comprises a gaming controller;
in response to receiving the command, querying a plurality of computing devices to determine whether any of the plurality of computing devices are within a communication range of the peripheral, said querying comprising transmitting a query with a wake-up command directing the peripheral to transition to a different power state and responsively transmit location information to at least one of the plurality of computing devices;
receiving, from the at least one of the plurality of computing devices, the location information of the peripheral transmitted in response to the wake-up command;
determining a location of the peripheral based on the received location information; and
providing the location of the peripheral to the user.

12. The method of claim 11, wherein the computing device communicates a serial number of the peripheral over the network to instruct the one or more other computing devices to determine the location of the peripheral.

13. The method of claim 11, wherein the one or more other computing devices obtain the location of the peripheral via activating a location sensor associated with the peripheral.

14. The method of claim 11, wherein receiving the command from the user to locate the peripheral comprises receiving a command from a user to locate a peripheral that is in a low-power state.

15. The method of claim 11, wherein receiving the command from the user comprises receiving a command from a user via a natural user interface.

16. The method of claim 11, wherein receiving the command from the user comprises receiving a voice command that is interpreted via an always-on speech recognition application running on the computing device.

17. One or more computer storage media embodying computer-executable components which, when executed, perform hub-to-hub peripheral discovery, said components comprising:
an interface component that when executed by at least one processor causes the at least one processor to receive a command from a user to locate a peripheral for interaction with a computing device, the peripheral being outside a communication range of the computing device;
a peripheral data component that when executed by at least one processor causes the at least one processor to obtain a history log stored on the peripheral, the history log indicating a history of connections that the peripheral had with a plurality of computing devices inside a premises;
a communication component that when executed by at least one processor causes the at least one processor to, based on the history of connections had with the plurality of computing devices inside the premises, identify at least one other computing device inside the premises that is likely in communication range of the peripheral, request over a network the at least one other computing device inside the premises attempt to communicate with the peripheral, and receive location information of the peripheral from the at least one other computing device inside the premises in communication with the peripheral; and
a display component that when executed by at least one processor causes the at least one processor to display a location of the peripheral inside the premises to a user based on the received location information from the at least one other computing device inside the premises.

18. The one or more computer storage media of claim 17, wherein the premises comprises a house of the user.

19. The one or more computer storage media of claim 17, wherein the wherein the peripheral is a gaming controller, a mobile telephone, a laptop, a tablet, a gaming device, a portable media player, or a desktop personal computer.

20. The one or more computer storage media of claim 17, wherein the location information includes sensor data captured by one or more sensors on the peripheral, the sensor data comprising data indicating a location of the peripheral relative to another object.

* * * * *